United States Patent
Kallepalli et al.

(10) Patent No.: US 12,412,031 B2
(45) Date of Patent: Sep. 9, 2025

(54) NATURAL LANGUAGE QUERY DISAMBIGUATION

(71) Applicant: Intuit Inc., Mountain View, CA (US)

(72) Inventors: Goutham Kallepalli, Mountain View, CA (US); Richard J. Becker, Edmonton (CA); Olabode Idowu, Edmonton (CA); Corinne Finegan, Mountain View, CA (US)

(73) Assignee: Intuit Inc., Mountain View, CA (US)

( * ) Notice: Subject to any disclaimer, the term of this patent is extended or adjusted under 35 U.S.C. 154(b) by 331 days.

(21) Appl. No.: 17/877,819

(22) Filed: Jul. 29, 2022

(65) Prior Publication Data
US 2024/0037327 A1    Feb. 1, 2024

(51) Int. Cl.
G06F 40/211    (2020.01)
G06F 16/334    (2025.01)
G06N 3/08      (2023.01)

(52) U.S. Cl.
CPC ........ G06F 40/211 (2020.01); G06F 16/3344 (2019.01); G06N 3/08 (2013.01)

(58) Field of Classification Search
None
See application file for complete search history.

(56) References Cited

U.S. PATENT DOCUMENTS

| | | | |
|---|---|---|---|
| 10,654,380 B2* | 5/2020 | Chang | G06F 16/3344 |
| 10,726,002 B1* | 7/2020 | Srivastava | G06F 16/28 |
| 10,733,993 B2* | 8/2020 | Kudurshian | G06F 16/9032 |
| 11,520,815 B1* | 12/2022 | Gutta | G06F 40/279 |
| 2018/0095962 A1* | 4/2018 | Anderson | G06F 16/2365 |
| 2019/0103111 A1* | 4/2019 | Tiwari | G06F 16/3329 |
| 2019/0370629 A1* | 12/2019 | Liu | G06N 5/041 |
| 2021/0104236 A1* | 4/2021 | Doggett | G10L 15/22 |
| 2022/0092272 A1* | 3/2022 | Swift | G06F 16/3329 |
| 2022/0101276 A1* | 3/2022 | Banatao | G16C 20/30 |

(Continued)

OTHER PUBLICATIONS

"JSON." Wikipedia, Feb. 15, 2020, https://en.wikipedia.org/wiki/JSON. Accessed Aug. 9, 2024 via web.archive.org. URL: https://web.archive.org/web/20200215034517/https://en.wikipedia.org/wiki/JSON (Year: 2020).*

(Continued)

*Primary Examiner* — Hai Phan
*Assistant Examiner* — Jon Christopher Meis
(74) *Attorney, Agent, or Firm* — Lathrop GPM LLP

(57) ABSTRACT

A method, computer program product, and system are provided. A first natural language text is received via a user interface. A generative pretrained transformer machine learning model processes the first natural language text and a context to identify a first intent. The processing is based in part on a syntax determined from a set of natural language completion paradigms. The generative transformer machine learning model maps the first set of parameters to a first query. The mapping is associated with a first confidence. The generative transformer machine learning model processes the first set of parameters and the first query to generate a set of execution steps. The processing is performed when the first confidence satisfies a threshold. The set of execution steps is parsed into a query object that is forwarded to a reporting service.

12 Claims, 7 Drawing Sheets

(56) References Cited

U.S. PATENT DOCUMENTS

| | | | | |
|---|---|---|---|---|
| 2022/0156823 | A1* | 5/2022 | Tremblay | G06F 40/20 |
| 2022/0180056 | A1* | 6/2022 | Hong | G06F 9/547 |
| 2022/0229832 | A1* | 7/2022 | Li | G06F 16/24578 |
| 2022/0366153 | A1* | 11/2022 | Li | G06F 3/0481 |
| 2023/0197067 | A1* | 6/2023 | Robert Jose et al. | G06F 16/90332 704/251 |
| 2023/0237281 | A1* | 7/2023 | Yarlagadda | G06N 5/01 |
| 2024/0020484 | A1* | 1/2024 | Will, IV | G06F 3/167 |

OTHER PUBLICATIONS

Yao et al. "Model-based Interactive Semantic Parsing: A Unified Framework and A Text-to-SQL Case Study." Aclanthology, 2019, https://aclanthology.org/D19-1547.pdf. Accessed Jan. 23, 2025. (Year: 2019).*

Zeng et al. "Photon: A Robust Cross-Domain Text-to-SQL System." arXiv, Aug. 3, 2020, https://arxiv.org/pdf/2007.15280. Accessed Jan. 23, 2025. (Year: 2020).*

Rajkumar et al. "Evaluating the Text-to-SQL Capabilities of Large Language Models." arXiv, Mar. 15, 2022, https://arxiv.org/pdf/2204.00498. Accessed Jan. 23, 2025. (Year: 2022).*

Yu et al. "SyntaxSQLNet: Syntax Tree Networks for Complex and Cross-Domain Text-to-SQL Task." arXiv, Oct. 25, 2018, https://arxiv.org/pdf/1810.05237. Accessed Jan. 23, 2025. (Year: 2018).*

* cited by examiner

Prompt & Completion Pairs
200

{"prompt": "What was the last invoice for \n\n###\n\n ",
 "completion": "Suggestion 1: Show all the product or service from your most recent invoice\n
        Suggestion 2: Show all the from your most recent invoice\n
        Suggestion 3: Show all the customer name from your most recent invoice\n  END  "}

{"prompt": "What is my last invoice from Faulkner-Howard \n\n###\n\n ",
 "completion": "Suggestion 1: The amount from your most recent invoice where the customer name is Faulkner-Howard\n
        Suggestion 2: What are most recent invoice where the customer name is Faulkner-Howard\n  END  "}

{"prompt": "See the my average invoice from Campos PLC \n\n###\n\n ",
 "completion": "Suggestion 1: See the average amount from invoices where the customer name is Campos PLC\n  END  "}

{"prompt": "When was the last time we billed for Service Junk Removal \n\n###\n\n ",
 "completion": "Suggestion 1: Display the the invoice date of the most recent invoice where the product or service is Junk Removal\n  END  "}

{"prompt": "How often do we bill Service Junk Removal for Garcia, Hamilton and Carr \n\n###\n\n ",
 "completion": "Suggestion 1: Display the number of invoices by week for the product or service Junk Removal where the customer name is Garcia, Hamilton and Carr\n
        Suggestion 2: See the number of invoices by month for the product or service Junk Removal where the customer name is Garcia, Hamilton and Carr\n
        Suggestion 3: See the number of invoices by quarter for the product or service Junk Removal with the customer name is Garcia, Hamilton and Carr\n
        Suggestion 4: See the number of invoices by year for the product or service Junk Removal with the customer name is Garcia, Hamilton and Carr\n  END  "}

{"prompt": "How many Green, Trujillo and Dunn invoices are still outstanding \n\n###\n\n ",
 "completion": "Suggestion 1: Display the number of invoices where the status is unpaid the customer name is Green, Trujillo and Dunn\n  END  "}

{"prompt": "How many invoices were paid yesterday \n\n###\n\n ",
 "completion": "Suggestion 1: See your the number of invoices where the paid date was yesterday\n  END  "}

{"prompt": "How many invoices have we sent to customer Lee PLC \n\n###\n\n ",
 "completion": "Suggestion 1: See the number of invoices where the customer name is Lee PLC\n  END  "}

{"prompt": "How many invoices are still outstanding for customer Davis-Kaiser as of 1977-06-03 \n\n###\n\n ",
 "completion": "Suggestion 1: What is number of invoices where the customer name is Davis-Kaiser and the status is unpaid and the due date is before 1977-06-03\n  END  "}

*FIG. 2*

Input and Output Pairs
300

Clarifying suggestions model:
    Input: What was the last invoice for?
        Context: "Invoices", "20 months", "Manufacturing"
    Output:
        Suggestion 1. See the product/service from your most recent invoice
        Suggestion 2. See the description from your most recent invoice
        Suggestion 3. See the customer name from your most recent invoice Execution steps generator model:
    Input : See the number of invoices where the customer name is ABC and the status is unpaid
    Output:
        Step 1: Invoices
        Step 2: Filter by customer_name = ABC and paid_status = UNPAID
        Step 3: Group by paid_status

*FIG. 3*

NATURAL LANGUAGE QUERY DISAMBIGUATION

BACKGROUND

When a user is using a software application, users often want to perform a search about a topic to obtain information. To perform the search, the user inputs a user query that is in a natural language. Such a user query may be, for example, a spoken or typed question or command. A user query may thus have the structure of a user's language. For example, the user query may be a standard natural language query. The user query may deviate from the user's language. For example, the natural language query may include typos, may include jargon, etc. Further, the user query may be a non-standard natural language query. The search engine performs a search based on the user query. A general challenge exists in having the computer system determine the user's intent by the user query and return search results that are responsive to the user's intent when the user's intent may not be accurately reflected in the query.

SUMMARY

In general, in one aspect, one or more embodiments related to a method. The method includes receiving a first natural language text via a user interface. The method includes processing, by a generative pretrained transformer machine learning model, the first natural language text and a context to identify a first intent. The processing is based in part on a syntax determined from a set of natural language completion paradigms. The method further includes mapping, by a generative transformer machine learning model, the first intent to a first query. The mapping is associated with a first confidence. The method also includes processing, by a generative transformer machine learning model, the first intent and the first query to generate a set of execution steps. The processing is performed when the first confidence satisfies a threshold. The method further includes parsing the set of execution steps into a query object. The method also includes forwarding the query object to a reporting service.

In general, in one aspect, one or more embodiments related to a computer program product comprising non-transitory computer-readable program code that, when executed by a computer processor of a computing system, cause the computing system to perform a method. The method includes processing, by a generative pretrained transformer machine learning model, the first natural language text and a context to identify a first intent. The processing is based in part on a syntax determined from a set of natural language completion paradigms. The method further includes mapping, by a generative transformer machine learning model, the first intent to a first query. The mapping is associated with a first confidence. The method also includes processing, by a generative transformer machine learning model, the first intent and the first query to generate a set of execution steps. The processing is performed when the first confidence satisfies a threshold. The method further includes parsing the set of execution steps into a query object. The method also includes forwarding the query object to a reporting service.

In general, in one aspect, one or more embodiments related to a system that includes a computer processor, memory, and instructions stored in the memory. The instructions are executable by the computer processor to cause the computer processor to perform a method. The method includes processing, by a generative pretrained transformer machine learning model, the first natural language text and a context to identify a first intent. The processing is based in part on a syntax determined from a set of natural language completion paradigms. The method further includes mapping, by a generative transformer machine learning model, the first intent to a first query. The mapping is associated with a first confidence. The method also includes processing, by a generative transformer machine learning model, the first intent and the first query to generate a set of execution steps. The processing is performed when the first confidence satisfies a threshold. The method further includes parsing the set of execution steps into a query object. The method also includes forwarding the query object to a reporting service.

Other aspects of the technology will be apparent from the following description and the appended claims.

BRIEF DESCRIPTION OF DRAWINGS

FIG. 2 is an example of prompt paradigms and completion in accordance with one or more embodiments FIG. 3 is an example of dynamically generated clarifying questions in accordance with one or more embodiments.

DETAILED DESCRIPTION

Figure 1:
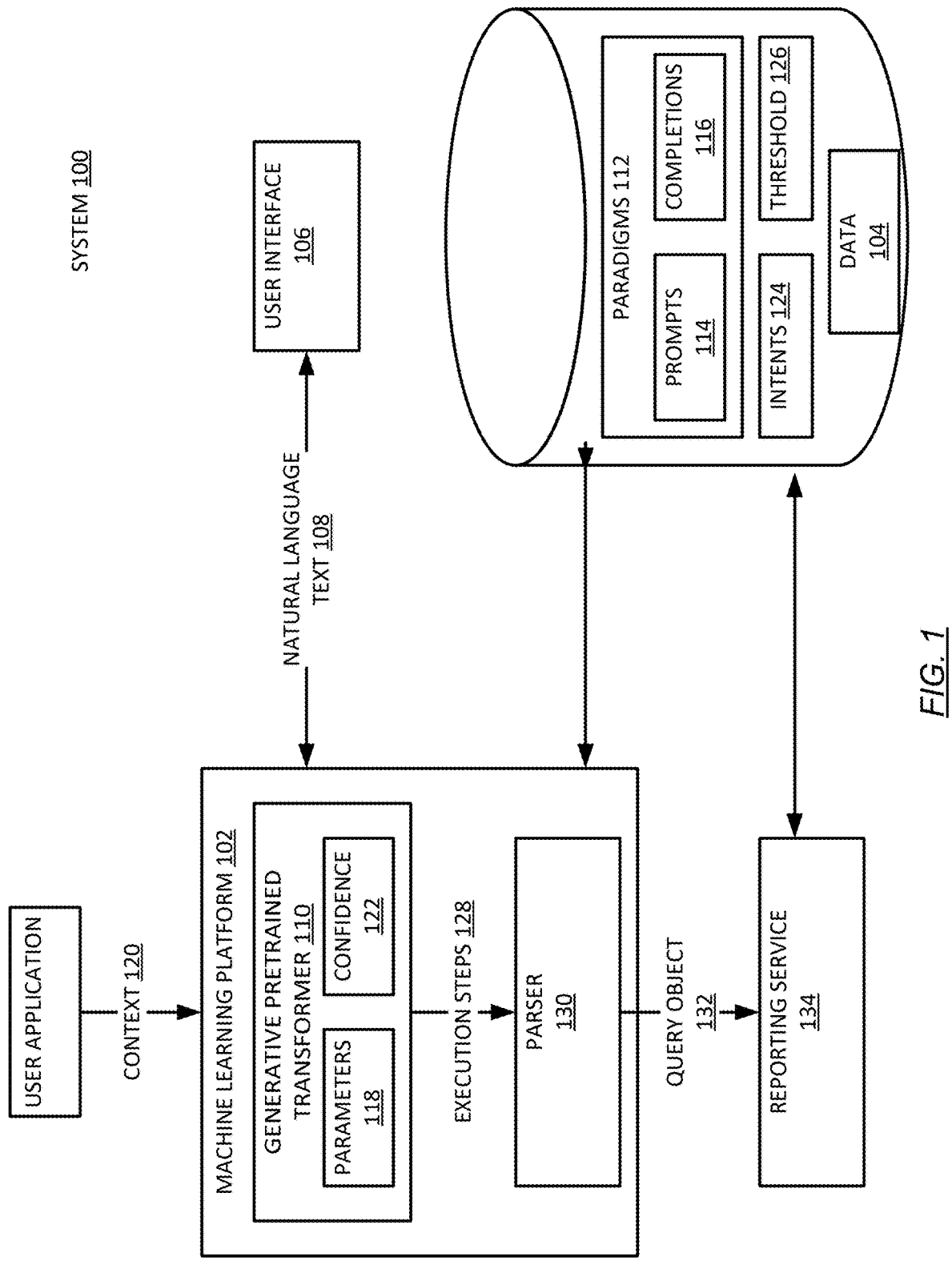
FIG. 1 is a diagram of a system in accordance with one or more embodiments.

Specific embodiments will now be described in detail with reference to the accompanying figures. Like elements in the various figures are denoted by like reference numerals for consistency.

In the following detailed description of embodiments, numerous specific details are set forth in order to provide a more thorough understanding. However, it will be apparent to one of ordinary skill in the art that embodiments may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to be a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the disclosure implement a machine learning platform. The platform implements a large-scale transformer model that allows users to generate reports and obtain data through a natural language (NL) interface. The system processes reporting interactions to select reports based on a natural language request and disambiguates the request through dynamically generated, context-aware questions.

For example, a natural language (NL) request provided by a user may not be sufficient to provide a reasonable mapping to a reporting service. If the system is unable to map the request with reasonable certainty, a series of clarification questions are generated to remove ambiguity from the user's initial request. This request-evaluate-clarify process repeats until the system is confident of the user's intent and the request can be mapped to a report. The platform generates a JavaScript object notation (JSON) package which is submitted to the reporting service, and subsequently generates the report from the queried data.

Embodiments of the disclosure take advantage of extremely large transformers models for natural language processing and available context information to interpret and obtain a user's intents through a natural language exchange. This interaction guides the user to their intended data in an intuitive manner that requires no pre-knowledge of the reporting interface.

The figures show diagrams of embodiments that are in accordance with the disclosure. The embodiments of the figures may be combined and may include or be included within the features and embodiments described in the other figures of the application. The features and elements of the figures are, individually and as a combination, improvements to the technology of machine learning and computing systems. The various elements, systems, components, and steps shown in the figures may be omitted, repeated, combined, and/or altered as shown from the figures. Accordingly, the scope of the present disclosure should not be considered limited to the specific arrangements shown.

Turning to FIG. 1, the system (100) implements a machine learning platform (102) to disambiguate queries. Users of the system (100) interact with the machine learning platform (102) to generate queries of data (104), which is used to generate reports.

User interface (106) may be implemented on a non-portable computing device such as a desktop personal computer, a laptop, a tablet computer, a smartphone, etc. Any number of computing devices may be part of the system (100). An example of a computing system, in accordance with one or more embodiments, is provided in FIG. 7A and FIG. 7B.

The user interface (106) may enable a user to access one or more software applications that provide one or more functionalities supporting tasks, for example, accounting tasks, tax calculation tasks, administrative tasks, multimedia tasks, social network tasks, etc. These software applications may perform any task that involves some degree of interaction with a user.

The user interface (106) may be implemented as part of an application front-end enabling the user to access a back-end that provides some, most, or all functionality of the software application. The application front-end may be a standalone executable application or a browser-hosted application, a smartphone or tablet app, or any other application capable of software functionality to the user. Those skilled in the art will appreciate that the configuration of the user interface (106) may depend on the purpose and/or configuration of the software application and may vary without departing from the disclosure.

In one or more embodiments, the user interface (106) may provide functionality for the input of spoken and/or typed language in the form of natural language text (108). For example, user interface (106) can be configured to receive a query, which may be forwarded to the machine learning platform (102) for further processing. The query is provided in any format, including, but not limited to spoken and/or typed language. The query may represent a user's intent. For example, the user may submit the query to research some information, to obtain technical support, to instruct the software application to perform one or more operations, etc. Broadly speaking, the query may thus include search requests or requests for information and/or commands. The query may be provided using typed and/or spoken natural language. However, the user query may be ambiguous, when analyzed without context. For example, the query may include one or more grammatical errors, jargon, vernacular language, mispronunciations homophones, or homographs, which may lead to interpretations that return data (104) that is unintended or irrelevant.

In one or more embodiments, machine learning platform (102) is a generative pretrained transformer (110). The generative pretrained transformer (110) is a large language model that uses a deep neural network for natural language processing (NLP). By providing a number of paradigms (112), including prompts (114) and completions (116), the generative pretrained transformer (110) is tuned to generate a series of execution steps in a syntax modeled by the paradigms (112). In one or more embodiments, the syntax can be a series of structured query language (SQL) type statements.

In accordance with one or more embodiments of the disclosure, the generative pretrained transformer (110) includes functionality to make a prediction of the execution steps underlying the query, based on the intents (124) identified from the natural language text (108) and the context (120).

In one or more embodiments, the context (120) may include one or more logs, events, paths, etc. that is collected as a user interacts with a software application. The context (120) may document interactions of a user with the software application. For example, the context (120) may include a history of page clicks and/or text inputs performed by the user to track the user's interaction with the software application. A user activity may, thus, be documented by storing an identifier for the user activity in the context (120). The level of detail of user activity that is documented may vary. For example, while in some scenarios, the context may document any or almost any user activity, in other scenarios, not all user activities may be documented. In some embodiments, page identifiers for pages or screens that the user has accessed may be documented. The generative pretrained transformer (110) utilizes context (120) when predicting the user's underlying intent generative pretrained transformer (110) outputs a confidence (122) for mappings between the query and a predicted intent (124). A threshold (126) may be set (e.g., confidence interval of 50%, 75%, 95% etc.), where if the prediction sits outside of the confidence interval, the machine learning platform (102) dynamically generates natural language text (108), using the generative pretrained transformer (110). The output of this model is a series of clarifying questions, which is sent to the user interface as natural language text (108).

As described above, the execution steps (128) can be a series of structured query language (SQL) statements. The generative pretrained transformer (110) can dynamically generate the execution steps according to the modeled syntax of paradigms (112) when the confidence (122) satisfies the threshold (126).

Parser (130) is a software compiler or interpreter component that is configured to build query objects (132) from execution steps (128). Parser (130) includes functionality to read the execution steps (128) output from generative pretrained transformer (110) and to build a query object (132)

of structured data that can be utilized by reporting service (134). The parser (130) is generally aware of a schema used by reporting service (134) and generates SQL-type actions based on each of the execution steps (128) including any requisite entities, filters, dates, ranges, groups and/or projections.

The illustrative embodiments described herein enable a computer system having a natural language interface that utilizes available metrics, logs, and other context-related information to disambiguate the initial request. The system follows-up with generated queries to further reduce the ambiguity of the request. Combined, this interaction guides the user to their intended data in an intuitive manner that requires no pre-knowledge of the reporting interface.

While FIG. 1 shows a configuration of components, other configurations may be used without departing from the scope of the invention. For example, various components may be combined to create a single component. As another example, the functionality performed by a single component may be performed by two or more components.

FIG. 2 is an example of prompt and completion paradigms in accordance with one or more embodiments. The prompt and completion pairs (200) serve as examples that enable the fine-tuning of the generative pretrained transformer to generate the different clarifying suggestions that are relevant to the Natural Language query received as input from the user. These pairs enable fine-tuning of the model to generate the clarifying questions for an unknown prompt. The prompt and completion pairs (200) are free-form natural language encoded as strings. The prompt and completion pairs (200) are encoded as a JSON to fine-tune the generative pretrained transformer.

FIG. 3 is an example of dynamically generated clarifying questions in accordance with one or more embodiments. The input and output pairs (300) serve as instructions that enable the generative pretrained transformer to generate the different clarifying suggestions that are relevant to the Natural Language query received as input from the user. These instructions enable the model to understand the underlying structure of the expected response. The instructions are combined with the unknown user input as free-form natural language, encoded as a single string and sent as input to the generative pretrained transformer to generate the set of clarifying suggestions.

Figure 4:
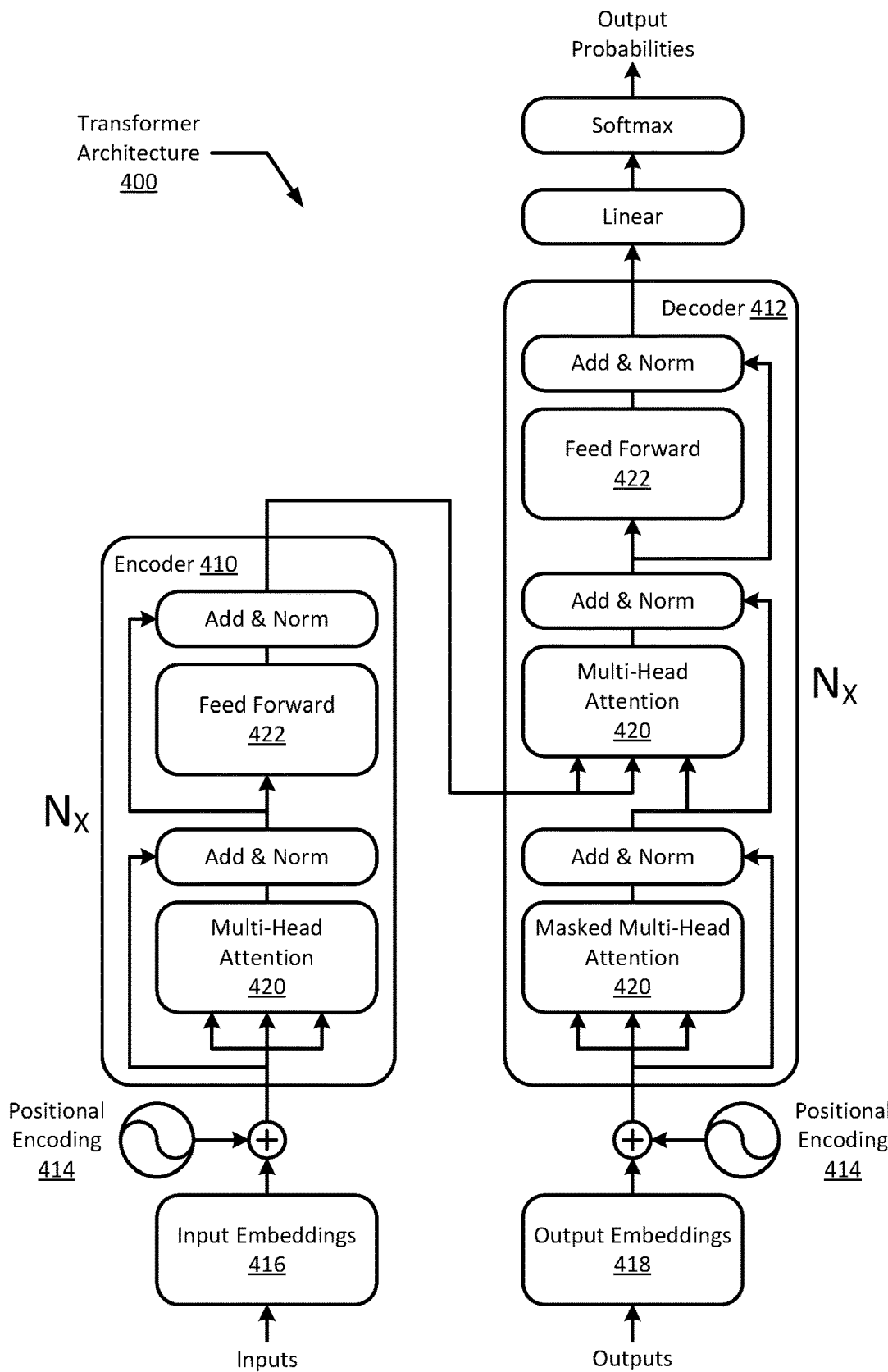
FIG. 4 is a diagram of a transformer architecture in accordance with one or more embodiments

FIG. 4 illustrates a transformer architecture. Transformer architecture (400) can be used to implement the generative pretrained transformer (110) of FIG. 1. The transformer, in comparison to recurrent neural networks (RNN), is less prone to suffering from the vanishing gradient problem which is characteristic of networks using gradient-based optimization techniques (i.e., reduced efficacy due to the earlier layers learning being slower than the learning of later layers due to temporal information decay).

The transformer architecture (400) relies on a self-attention (intra-attention) mechanism, thereby eliminating the recurrent operations computed in Recurrent Neural Networks, which may be used to compute the latent space representation of both the encoder (410) and decoder (412) sides. Positional encoding (414) is added to the input and output embeddings (416, 418) with the absence of recurrence. The positional information, which is similar to a time-step in a recurrent network, provides the Transformer network with the order of input and output sequences. A combination of absolute positional encoding and relative positional information may be used. Input from the previously generated symbol is auto-regressively used by the model for the next prediction which is organized as a stack of encoder-decoder networks. In addition, uniform layers compose both the encoder (410) and decoder (412), and each layer is built of two sublayers: a multi-head self-attention layer (420) and a position-wise feed-forward network (FFN) layer (422). The multi-head sub-layer (420) enables the use of multiple attention functions with an equivalent cost of utilizing attention, while the FFN sub-layer (422) uses a fully connected network to process the attention sublayers. The FFN applies multiple linear transformations on each position and a Rectified Linear Unit (ReLU) which extends the self-attention mechanism to efficiently consider representations of the relative positioning (i.e., distances between sequence elements). An efficient implementation of a relation-aware self-attention mechanism is, thus, achieved.

In one embodiment of the disclosure, the transformer architecture is a generative pretrained transformer model, such as OpenAI's GPT-3, Nvidia's Megatron-LM, or Microsoft's Turing-NLG, that utilize massive data sets and scaling of the transformer architecture. For example, the GPT-3 training data set includes results from a massive web crawl. This volume of data allows the expansion of GPT-3 to 175 billion parameters using 96 attention layers, each with a 96×128 dimension head, enabling few or zero-shot training paradigms. By prompting the model with a few response paradigms, the GPT-3 model understands the context, produces results, and can structure its response automatically, without any parameter retraining.

Figure 5:
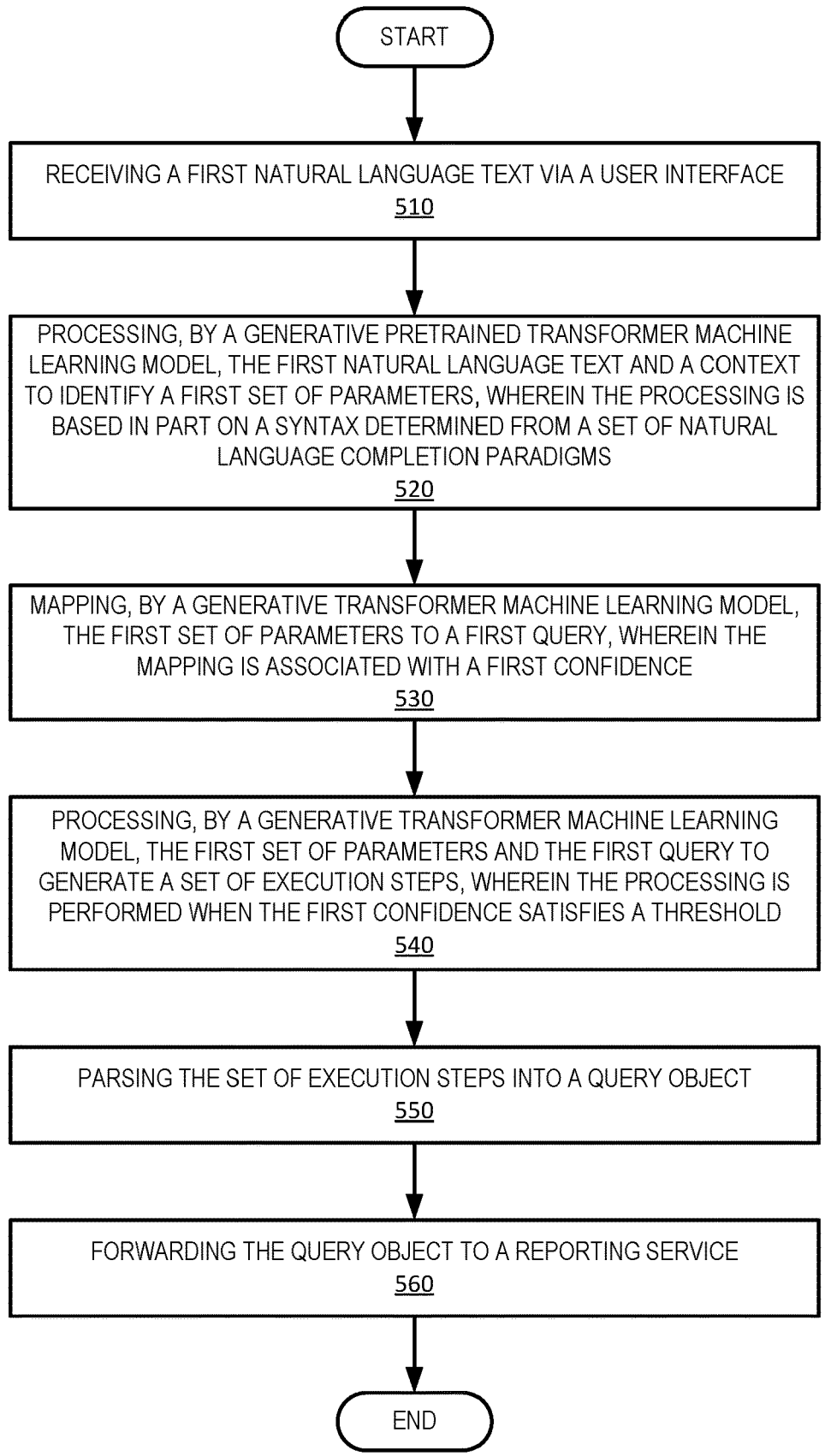
FIG. 5 shows a flowchart in accordance with one or more embodiments.

FIG. 5 shows a flowchart in accordance with one or more embodiments. While the various steps in this flowchart are presented and described sequentially, one of ordinary skill will appreciate that some or all the steps may be executed in different orders, may be combined, or omitted, and some or all the steps may be executed in parallel. Accordingly, embodiments should not be considered limited to the specific number and arrangement of blocks shown in FIG. 5. FIG. 5 provides a general overview of one or more embodiments.

In block 510, a first natural language text is received via a user interface. An interface may be for spoken language, allowing a user to submit natural language queries.

In block 520, a generative pretrained transformer machine learning model processes the first natural language text and a context to identify intent. The processing is based in part on a syntax determined from a set of natural language completion paradigms. For example, the generative pretrained transformer machine learning model can be tuned using a series of prompt and expected completions. These prompts and completions provide the model with additional learnable embeddings which are directly prepended to the sequence at the embedding layers (416 and 418) in FIG. 4. The encoder (410) in FIG. 4 maps the input sequence to vector representations using a self-attention mechanism, with the learnable prompt embeddings being inserted at the first layer. The decoder (412) in FIG. 4 generates the text to classify the example based on the encoder representations, again using an attention mechanism, with the learnable completion embeddings being inserted at the last layer.

Given a sufficient number of appropriate examples, the model will produce suggestions of a syntax similar to that of the examples prior. In other words, the format of the output depends on the syntax of the example prompts and completions, enabling the model to produce syntactically similar completions when presented with different prompts.

In block 530, the generative pretrained transformer machine learning model maps the first intent to generate a first query. The mapping is associated with a first confidence.

The query may include one or more execution steps, which may be provided as SQL-type statements.

In block 540, the generative pretrained transformer machine learning model processes the first intent and the first query to generate a set of execution steps. The processing is performed when the first confidence satisfies a threshold. For example, the threshold may specify a confidence interval.

In certain embodiments, when the first confidence does not satisfy a threshold, the generative pretrained transformer machine learning model processes the first query and a second query to dynamically generate a second natural language text. The processing is performed to clarify a first intent of the first natural language text. For example, the threshold may specify a confidence interval, where if the confidence is outside the threshold, then an event is triggered prompting the dynamic generation of a second natural language text.

In one embodiment, the second natural language is based in part on syntax determined from a set of natural language prompt paradigms. The second natural language text is forwarded to the user interface. The second natural language text comprises one or more clarification questions. The clarification questions are designed to disambiguate the first query from the second query.

In one embodiment, the generator pretrained transformer may then iteratively repeat this process of REQUEST→EVALUATE→CLARIFY until a mapping is generated that satisfies the threshold. For example, a third natural language text is received via the user interface. This third natural language text can be a user-submitted response to the clarifying questions. The generative pretrained transformer machine learning model processes the first intent and the third natural language text to generate a second intent.

The generative transformer machine learning model maps the second intent to the first query. The mapping is associated with a second confidence. When the second confidence satisfies the threshold, the generative transformer machine learning model processes the second intent and the first query to generate the set of execution steps.

In block 550, the set of execution steps is parsed into a query object. In one embodiment, the query object is a JSON object generated according to an API schema and based on the set of execution steps.

In block 560, the query object is forwarded to a reporting service. Where the query object has a JSON object, the JSON object can be forwarded to the reporting service, allowing for a native consumption of the object by the reporting service.

In one embodiment, data that was queried according to the query object is retrieved from an underlying data structure, and a report is generated from the data. The report is forwarded to the user interface for presentation. For example, the generative pretrained transformer machine learning model may processes the report to generate a fourth natural language text, which is forwarded to the user interface for presentation via a natural language interface.

Figure 6:
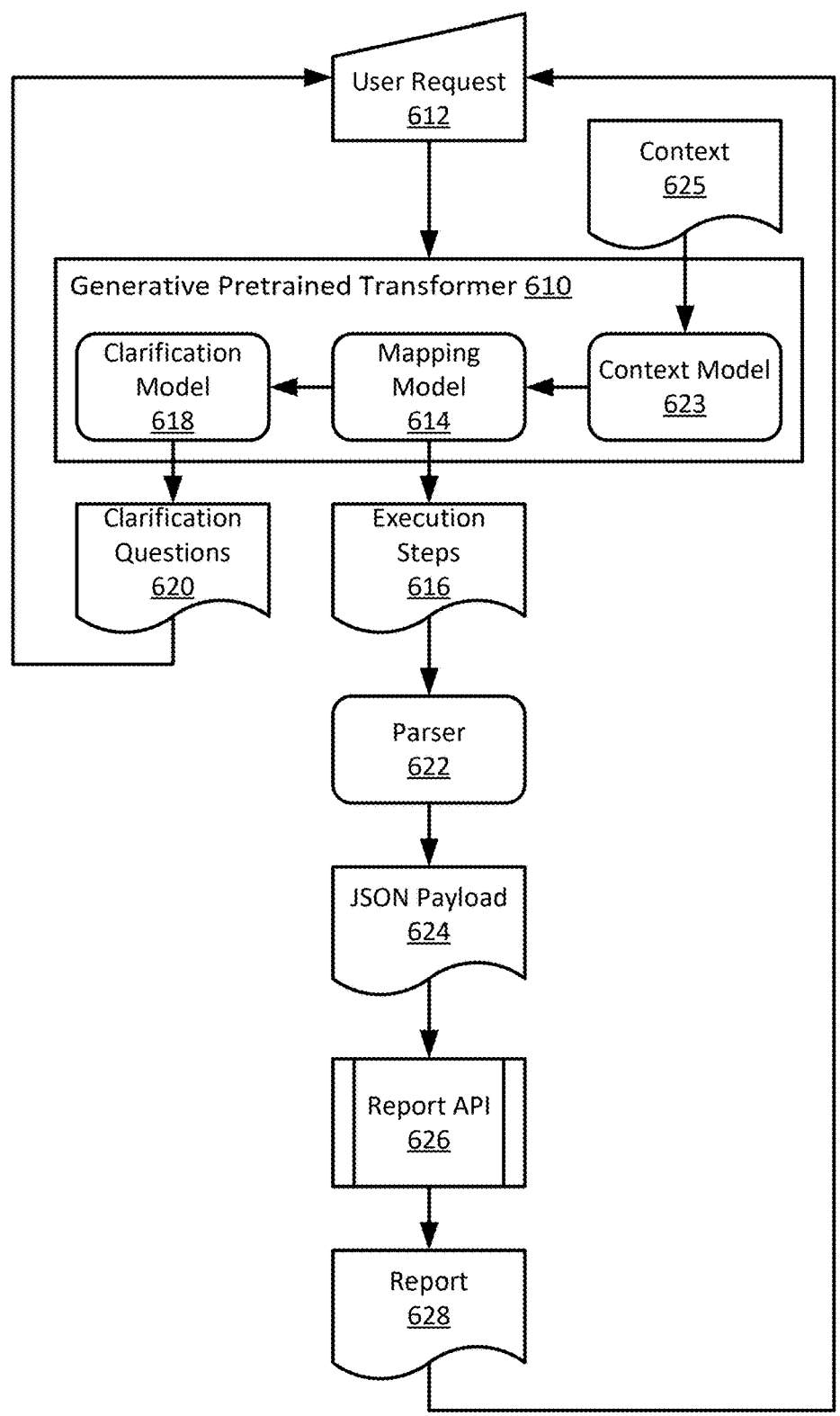
FIG. 6 shows an example system according to one or more illustrative embodiments.

The following example is for explanatory purposes only and not intended to limit the scope of the invention. FIG. 6 shows an example in accordance with one or more embodiments of the invention.

With the advent of extremely large Transformers Models (i.e., GPT-3, etc.), new methods of interpreting and obtaining intents from Natural Language (NL) are now possible. The embodiments described herein take advantage of those advances to interpret the Natural Language user requests in a very accurate manner. For the specific example of a reporting service, such as QuickBooks Online, the following steps are required along with the following methods of model generation.

The generative pretrained transformer (610) obtains a user request (612), which may be in textual form or through a Speech-to-Text generator. the user request (612) is submitted to the Mapping Model (614).

The Mapping Model (614) is an implementation of the generative pretrained transformer (610) that has been 'Fine Tuned,' through the submission of prompt and completion paradigms, to be aware of a reporting domain. In other words, the model is aware about the general steps required to formulate a query to the reporting service. The Mapping Model "knows" about filters, dates, ranges, groups, projections, etc. used by the reporting service to access data. The Model's purpose is to generate a series of steps that allow us to build a JSON package that in turn directly interfaces with the reporting service.

The natural language user request (612) may or may not be sufficient to provide a reasonable mapping to a reporting service. If the Mapping Model (614) is unable to generate a series of execution steps (616) with reasonable confidence based on the initial user request, the clarification model (618) generates a series of clarifying questions (620) designed to remove any ambiguity from the initial ask.

The Clarification Model (618) is an implementation of the generative pretrained transformer (610) that is designed to remove ambiguity by dynamically generating clarifying questions (620). The Context Model (623) provides context (625) as an input of additional signals, incorporating context in the form of logs, customer paths, key streams, etc., and produces intents based upon the fed context. This additional context (625) may narrow down the intent of the request and alleviate the need for subsequent questions.

The output of the clarification model (618) is a series of clarifying questions (620). The clarifying questions (620) are dynamically generated via the generative pretrained transformer (610). In other words, the questions are not selected from a pre-set list of possibilities. The clarifying questions (620) are then presented back to the user, who can respond, or optionally simply select an assertion.

User input is once again accepted, and the generative pretrained transformer (610) attempts again to complete the mapping using the Mapping Model (614). This process of REQUEST→EVALUATE→CLARIFY repeats until enough information to construct a mapping of a threshold confidence, and thereafter generate a series of execution steps (616). The generation of the execution steps (616) is fully dynamic based upon the 'Fine Tuned' mapping model (614), allowing for easier expansion to more reports and queries.

The Parser (622) receives the series of execution steps (616) and produces a JSON payload (624) that maps those steps to the reporting API (626) for the reporting service. The JSON payload (624) is submitted to the reporting API. The report (628) that is produced by the reporting service in response to the JSON payload (624) can be provided back to the user, either visually or possibly as an utterance if using speech as the main interface.

The subsequent clarification questions are also generated dynamically through a very large transformer model. Incorporating context in the form of logs, customer path, key streams, etc. that informs a model that produces intents based upon the fed context.

Figure 7A:
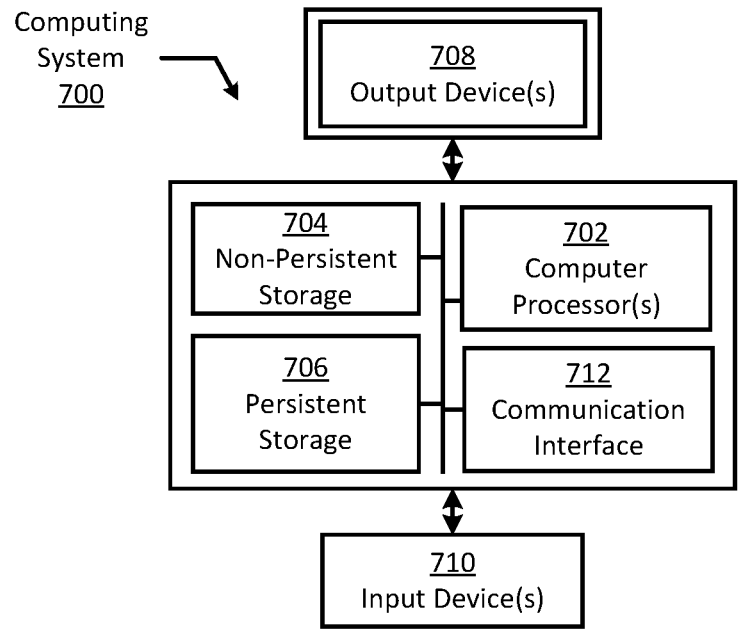
FIGS. 7A and 7B show a computing system in accordance with one or more embodiments.

Embodiments may be implemented on a computing system. Any combination of mobile, desktop, server, router, switch, embedded device, or other types of hardware may be used. For example, as shown in FIG. 7A, the computing system (700) may include one or more computer processors (702), non-persistent storage (704) (e.g., volatile memory, such as random access memory (RAM), cache memory), persistent storage (706) (e.g., a hard disk, an optical drive such as a compact disk (CD) drive or digital versatile disk (DVD) drive, a flash memory, etc.), a communication interface (712) (e.g., Bluetooth interface, infrared interface, network interface, optical interface, etc.), and numerous other elements and functionalities.

The computer processor(s) (702) may be an integrated circuit for processing instructions. For example, the computer processor(s) may be one or more cores or micro-cores of a processor. The computing system (700) may also include one or more input devices (710), such as a touchscreen, keyboard, mouse, microphone, touchpad, electronic pen, or any other type of input device.

The communication interface (712) may include an integrated circuit for connecting the computing system (700) to a network (not shown) (e.g., a local area network (LAN), a wide area network (WAN) such as the Internet, mobile network, or any other type of network) and/or to another device, such as another computing device.

Further, the computing system (700) may include one or more output devices (708), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (702), non-persistent storage (704), and persistent storage (706). Many different types of computing systems exist, and the aforementioned input and output device(s) may take other forms.

Software instructions in the form of computer readable program code to perform embodiments may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments.

Figure 7B:
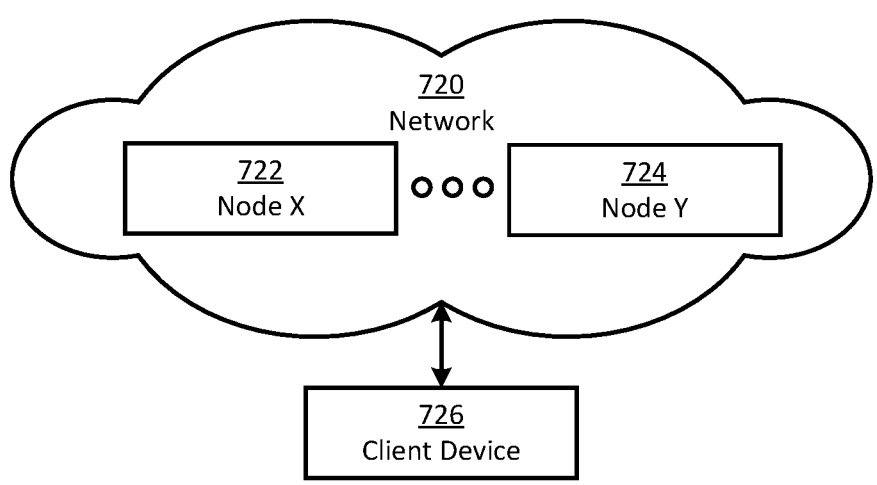

The computing system (700) in FIG. 7A may be connected to or be a part of a network. For example, as shown in FIG. 7B, the network (720) may include multiple nodes (e.g., node X (722), node Y (724)). Each node may correspond to a computing system, such as the computing system shown in FIG. 7A, or a group of nodes combined may correspond to the computing system shown in FIG. 7A. By way of an example, embodiments may be implemented on a node of a distributed system that is connected to other nodes. By way of another example, embodiments may be implemented on a distributed computing system having multiple nodes, where each portion may be located on a different node within the distributed computing system. Further, one or more elements of the aforementioned computing system (700) may be located at a remote location and connected to the other elements over a network.

Although not shown in FIG. 7B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (722), node Y (724)) in the network (720) may be configured to provide services for a client device (726). For example, the nodes may be part of a cloud computing system. The nodes may include functionality to receive requests from the client device (726) and transmit responses to the client device (726). The client device (726) may be a computing system, such as the computing system shown in FIG. 7A. Further, the client device (726) may include and/or perform at least a portion of one or more embodiments.

The computing system or group of computing systems described in FIG. 7A and FIG. 7B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, one authorized process may mount the shareable segment, other than the initializing process, at any given time.

Other techniques may be used to share data, such as the various data described in the present application, between processes without departing from the scope. The processes may be part of the same or different application and may execute on the same or different computing system.

Rather than or in addition to sharing data between processes, the computing system performing one or more embodiments may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments, may extract one or more data items from the obtained data. For example, the extraction may be performed as follows by the computing system in FIG. 7A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail—such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 7A, while performing one or more embodiments, may perform data comparison. Data comparison may be used to compare two or more data values (e.g., A, B). For example, one or more embodiments may determine whether A>B, A=B, A!=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments, A and B may be vectors, and comparing A with B involves comparing the first element of vector A with the first element of vector B, the second element of vector A with the second element of vector B, etc. In one or more embodiments, if A and B are strings, the binary values of the strings may be compared.

The computing system in FIG. 7A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g., join, full join, count, average, etc.), sort (e.g., ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 7A may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents a few examples of functions performed by the computing system of FIG. 7A and the nodes and/or client device in FIG. 7B. Other functions may be performed using one or more embodiments.

While one or more embodiments have been described with respect to a limited number of embodiments, those skilled in the art, having benefit of this disclosure, will appreciate that other embodiments may be devised which do not depart from the scope as disclosed herein. Accordingly, the scope should be limited by the attached claims.

What is claimed is:

1. A method comprising:
   iteratively until a confidence satisfies a threshold:
      receiving a first natural language text via a user interface,
      processing, by a generative pretrained transformer machine learning model, the first natural language text and a context to identify a first intent, wherein: the generative pretrained transformer machine learning model determines a latent space representation of both encoder and decoder sides of the generative pretrained transformer machine learning model,
      each layer of the encoder and decoder sides of the generative pretrained transformer machine learning model comprises a plurality of sublayers,
      the plurality of sublayers each comprise a multi-head self-attention layer and a position wise feed forward network layer that uses a fully connected network to process the multi-head self-attention layer, and
      processing by the generative pretrained transformer machine learning model comprises: executing the encoder and decoder sides of the generative pretrained transformer machine learning model on the first natural language text and the context, to insert a set of learnable prompt embeddings that are generated using a series of example prompts and corresponding completions, and to identify the first intent,
   mapping, by a generative transformer machine learning model, the first intent to a first query associated with the confidence,
   processing the first query to generate a clarification question in natural language text when the confidence fails to satisfy the threshold, and
   populating the user interface with the clarification question when the confidence fails to satisfy the threshold wherein prompt and completion pairs are encoded in JAVASCRIPT® object notation language (JSON) to fine-tune the generative pretrained transformer machine learning model;
processing, by the generative transformer machine learning model, the first intent and the first query to generate a series of structured query language (SQL) type statements, wherein the processing is performed when the confidence satisfies the threshold;
parsing the series of SQL type statements into a query object comprising a JSON payload comprising a series of execution steps;
forwarding the query object to a reporting service;
mapping the execution steps to a reporting application programming interface (API) of the reporting service to generate a mapping; and
generating a report using the mapping.

2. The method of claim 1, wherein parsing the series of SQL type statements comprises:
   generating a JSON object according to an API schema, wherein the JSON object is based the series of SQL type statements; and
   forwarding the JSON object to the reporting service.

3. The method of claim 1, further comprising:
   forwarding the report to the user interface.

4. The method of claim 3, further comprising:
   processing, by the generative pretrained transformer machine learning model, the report to generate a fourth natural language text; and
   forwarding the fourth natural language text to the user interface.

5. A computer program product comprising non-transitory computer-readable program code that, when executed by a computer processor of a computing system, causes the computing system to perform operations comprising:

iteratively until a confidence satisfies a threshold:
  receiving a first natural language text via a user interface,
  processing, by a generative pretrained transformer machine learning model, the first natural language text and a context to identify a first intent, wherein:
    the generative pretrained transformer machine learning model determines a latent space representation of both encoder and decoder sides of the generative pretrained transformer machine learning model,
    each layer of the encoder and decoder sides of the generative pretrained transformer machine learning model comprises a plurality of sublayers,
    the plurality of sublayers each comprise a multi-head self-attention layer and a position wise feed forward network layer that uses a fully connected network to process the multi-head self-attention layer, and
    processing by the generative pretrained transformer machine learning model comprises: executing the encoder and decoder sides of the generative pretrained transformer machine learning model on the first natural language text and the context, to insert a set of learnable prompt embeddings that are generated using a series of example prompts and corresponding completions, and to identify the first intent,
  mapping, by a generative transformer machine learning model, the first intent to a first query, wherein the mapping is associated with a first confidence,
  processing the first query to generate a clarification question in natural language text when the confidence fails to satisfy the threshold, and
  populating the user interface with the clarification question when the confidence fails to satisfy the threshold wherein prompt and completion pairs are encoded in JAVASCRIPT® object notation language (JSON) to fine-tune the generative pretrained transformer machine learning model;
processing, by the generative transformer machine learning model, the first intent and the first query to generate a series of structured query language (SQL) type statements, wherein the processing is performed when the confidence satisfies the threshold;
parsing the series of SQL type statements into a query object comprising a JSON payload comprising a series of execution steps;
forwarding the query object to a reporting service;
mapping the execution steps to a reporting application programming interface (API) of the reporting service to generate a mapping; and
generating a report using the mapping.

6. The computer program product of claim 5, wherein parsing the series of SQL type statements comprises:
  generating a JSON object according to an API schema, wherein the JSON object is based on the series of execution steps; and
  forwarding the JSON object to the reporting service.

7. The computer program product of claim 5, the operations further comprising:
  forwarding the report to the user interface.

8. The computer program product of claim 7, the operations further comprising:
  processing, by the generative pretrained transformer machine learning model, the report to generate a fourth natural language text; and
  forwarding the fourth natural language text to the user interface.

9. A system comprising:
a computer processor;
memory; and
instructions stored in the memory and executable by the computer processor to cause the computer processor to perform operations, the operations comprising:
  iteratively until a confidence satisfies a threshold:
    receiving a first natural language text via a user interface,
    processing, by a generative pretrained transformer machine learning model, the first natural language text and a context to identify a first intent, wherein:
      the generative pretrained transformer machine learning model determines a latent space representation of both encoder and decoder sides of the generative pretrained transformer machine learning model,
      each layer of the encoder and decoder sides of the generative pretrained transformer machine learning model comprises a plurality of sublayers,
      the plurality of sublayers each comprise a multi-head self-attention layer and a position wise feed forward network layer that uses a fully connected network to process the multi-head self-attention layer, and
      processing by the generative pretrained transformer machine learning model comprises: executing the encoder and decoder sides of the generative pretrained transformer machine learning model on the first natural language text and the context, to insert a set of learnable prompt embeddings that are generated using a series of example prompts and corresponding completions, and to identify the first intent,
    mapping, by a generative transformer machine learning model, the first intent to a first query associated with the confidence,
    processing the first query to generate a clarification question in natural language text when the confidence fails to satisfy the threshold, and
    populating the user interface with the clarification question when the confidence fails to satisfy the threshold wherein prompt and completion pairs are encoded in JAVASCRIPT® object notation language (JSON) to fine-tune the generative pretrained transformer machine learning model,
  processing, by the generative transformer machine learning model, the first intent and the first query to generate a series of structured query language (SQL) type statements, wherein the processing is performed when the confidence satisfies the threshold,
  parsing the series of SQL type statements into a query object comprising a JSON payload comprising a series of execution steps;
  forwarding the query object to a reporting service,
  mapping the execution steps to a reporting application programming interface (API) of the reporting service to generate a mapping, and
  generating a report using the mapping.

10. The system of claim 9, wherein parsing the series of SQL type statements comprises:

generating a JSON object according to an API schema, wherein the JSON object is based the series of execution steps; and forwarding the JSON object to the reporting service.

11. The system of claim 9, further comprising:

forwarding the report to the user interface.

12. The system of claim 11, further comprising:

processing, by the generative pretrained transformer machine learning model, the report to generate a new natural language text; and forwarding the new natural language text to the user interface.

* * * * *